United States Patent
Linn et al.

(10) Patent No.: US 9,452,638 B1
(45) Date of Patent: Sep. 27, 2016

(54) OFFSET CASTER

(71) Applicant: Choice Equipment Co., Inc., Pendergrass, GA (US)

(72) Inventors: Chad Aaron Linn, Jefferson, GA (US); Joseph John Bova, Lawrenceville, GA (US)

(73) Assignee: CHOICE EQUIPMENT CO., INC., Pendergrass, GA (US)

( * ) Notice: Subject to any disclaimer, the term of this patent is extended or adjusted under 35 U.S.C. 154(b) by 0 days.

(21) Appl. No.: 14/736,679

(22) Filed: Jun. 11, 2015

(51) Int. Cl.
*B60B 33/00* (2006.01)

(52) U.S. Cl.
CPC ....... *B60B 33/0018* (2013.01); *B60B 33/0005* (2013.01); *B60B 33/0007* (2013.01); *B60B 33/0049* (2013.01); *B60B 33/0065* (2013.01); *B60B 33/0068* (2013.01)

(58) Field of Classification Search
CPC .......... B60B 33/0018; B60B 33/0057; B60B 33/0076; B60B 33/00; B60B 33/0002; B60B 33/0005; B60B 33/0007; B60B 33/0015; B60B 33/04; B60B 33/0049; B60B 33/0068; B60B 33/0065
See application file for complete search history.

(56) References Cited

U.S. PATENT DOCUMENTS

| 4,316,305 A | * | 2/1982 | Seaford | B60B 33/0002 16/21 |
| 4,494,271 A | * | 1/1985 | Perlin | B60B 33/0002 16/18 A |
| 4,667,365 A | * | 5/1987 | Martinek | B60B 33/00 16/35 D |
| 5,209,167 A | * | 5/1993 | Donner | B60B 33/00 105/180 |
| 5,943,960 A | * | 8/1999 | Becker | B66C 9/08 105/180 |
| 2001/0042286 A1 | * | 11/2001 | Henriott | A47B 21/06 16/29 |
| 2005/0015928 A1 | * | 1/2005 | Arsenault | B60B 33/0002 16/300 |
| 2010/0107360 A1 | * | 5/2010 | Shih | B60B 1/006 16/21 |
| 2010/0247281 A1 | * | 9/2010 | Kempf | B60B 33/0039 414/800 |
| 2012/0042472 A1 | * | 2/2012 | Aubin | B60B 33/0015 16/46 |
| 2013/0174375 A1 | * | 7/2013 | Lin | B60B 33/0086 16/47 |
| 2013/0212834 A1 | * | 8/2013 | Chen | B60B 33/0018 16/45 |

* cited by examiner

*Primary Examiner* — Emily Morgan
(74) *Attorney, Agent, or Firm* — Michael Best & Friedrich LLP

(57) ABSTRACT

A caster includes a wheel supported for rotation about a rolling axis and a pin extending from the wheel along a pin axis in a direction normal to the rolling axis. A mounting plate includes a first aperture sized to receive the pin such that the wheel is rotatable about the pin axis. The mounting plate includes a plurality of mounting apertures arranged circumferentially around the first aperture, wherein a first of the mounting apertures is a first distance from the pin axis and a second of the mounting apertures is a second distance from the pin axis, the second distance being greater than the first distance. A bearing is positioned between the mounting plate and the wheel and is arranged to support rotation about the pin axis.

7 Claims, 5 Drawing Sheets

OFFSET CASTER

BACKGROUND

The invention relates to casters and more particularly to plate-style casters that are commonly used to support heavy objects for rolling movement.

SUMMARY

In one construction, a caster includes a wheel supported for rotation about a rolling axis and a pin extending from the wheel along a pin axis in a direction normal to the rolling axis. A mounting plate includes a first aperture sized to receive the pin such that the wheel is rotatable about the pin axis. The mounting plate includes a plurality of mounting apertures arranged circumferentially around the first aperture, wherein a first of the mounting apertures is a first distance from the pin axis and a second of the mounting apertures is a second distance from the pin axis, the second distance being greater than the first distance. A bearing is positioned between the mounting plate and the wheel and is arranged to support rotation about the pin axis.

In another construction, a caster includes a mounting plate having a first mounting aperture, a second mounting aperture, a third mounting aperture, and a fourth mounting aperture each arranged at the corners of a rectangle, and a wheel aperture having a center in the space defined by the rectangle and positioned nearer to a line extending between the first aperture and the second aperture than to a line extending between the third aperture and the fourth aperture, the first mounting aperture, the second mounting aperture, the third mounting aperture, and the fourth mounting aperture being the only mounting apertures in the plate. A wheel is supported for rotation about a rolling axis and a pin is coupled to the wheel and extends along a pin axis that is substantially normal to the rolling axis. A bearing interconnects the wheel and the mounting plate such that the pin is received in the wheel aperture and the wheel is rotatable about the pin axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
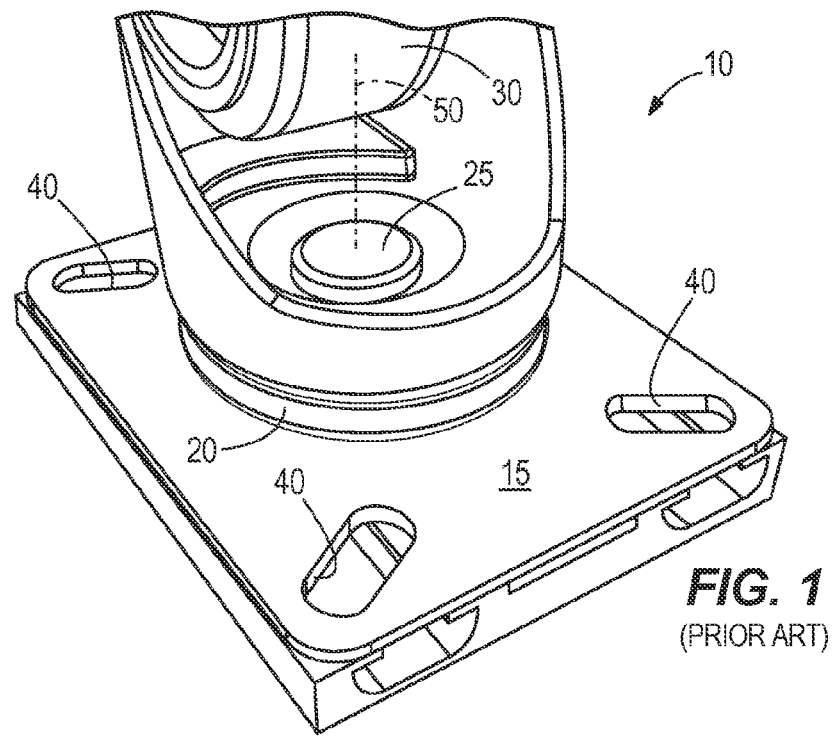
FIG. 1 is a perspective view of a prior art plate-type caster.
Figure 3:
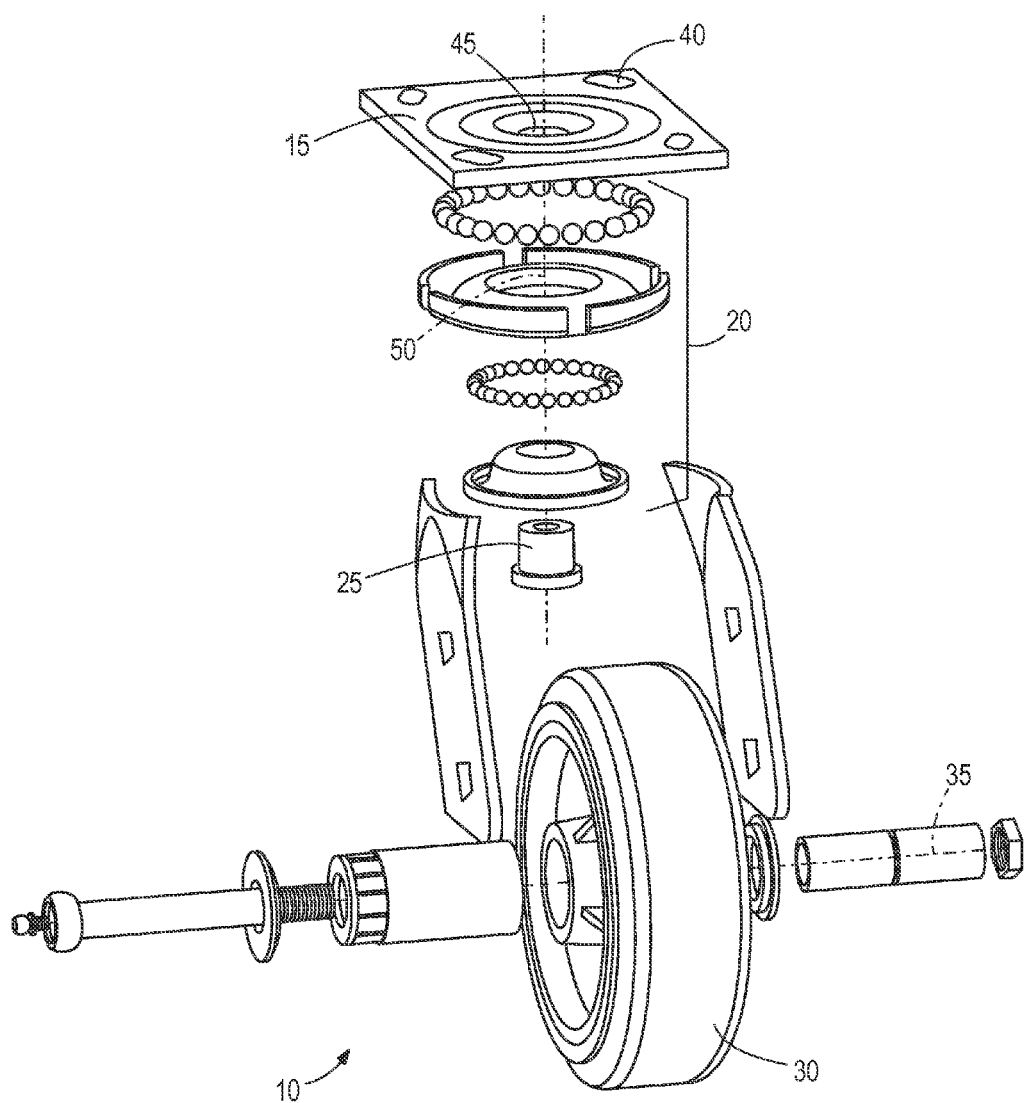
FIG. 3 is an exploded view of a prior art caster.

FIGS. 1 and 3 illustrate a prior art castor 10 of the type often used to support objects for rolling movement. The castor 10 includes a plate 15, a bearing 20, a pin 25, and a wheel 30 coupled to the pin 25 and supported for rotation about a rolling axis 35. The plate 15 is substantially rectangular and includes mounting apertures 40 in each corner. The pin 25 passes through a central aperture 45 in the plate 15 to attach the wheel 30 to the plate 15. The bearing 20 is positioned between the plate 15 and the wheel 30 and supports the weight of the object while allowing the wheel 30 to rotate around an axis 50 of the pin 25. Typically, the axis of the pin 50 is normal to the rolling axis 35 of the wheel 30.

Figure 2:
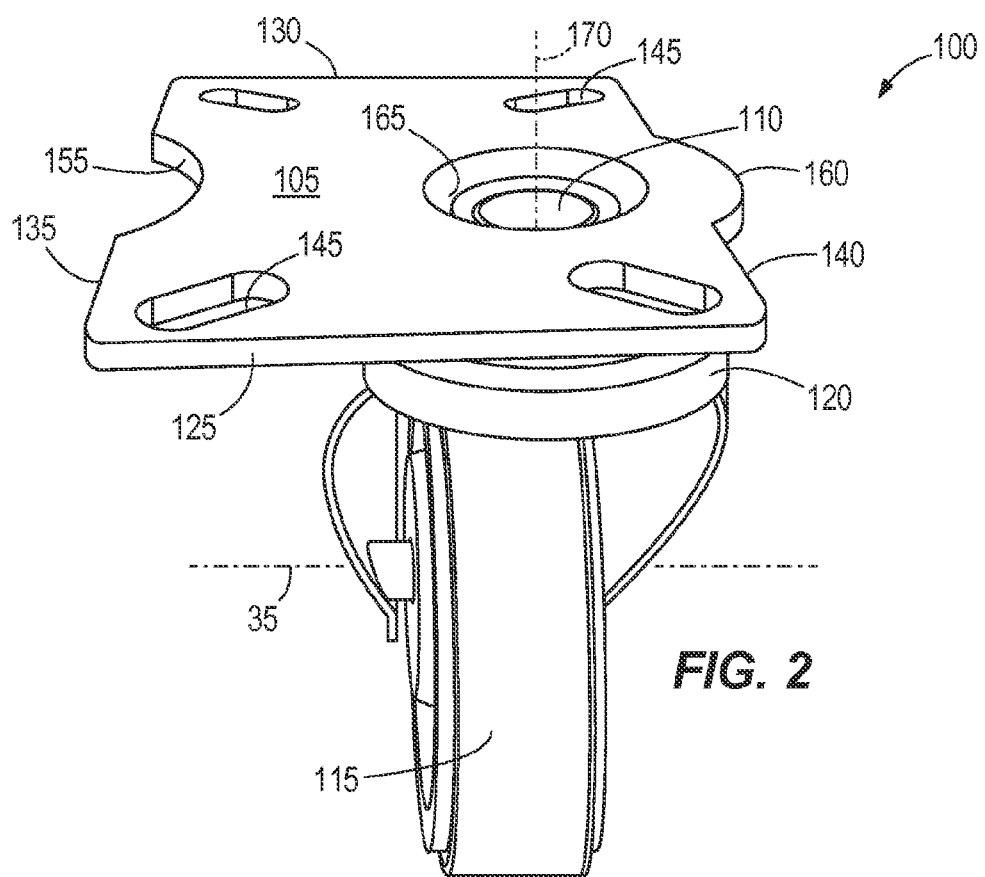
FIG. 2 is a perspective view of an offset caster.

FIG. 2 illustrates an improved castor 100 including a plate 105, a pin 110, a wheel 115, and a bearing 120. The pin 110, the wheel 115, and the bearing 120 are similar to those described with regard to FIGS. 1 and 3. The plate 105 includes two substantially linear edges 125, 130 that are connected by a first edge 135 and a second edge 140. The substantially linear edges 125, 130, the first edge 135, and the second edge 140 define four corners with a mounting aperture 145 formed adjacent each of the corners. In the illustrated construction, the mounting apertures 145 are elongated slots that allow for some adjustment of the positioning of the castor 100 when it is attached to an object 150.

Figure 4:
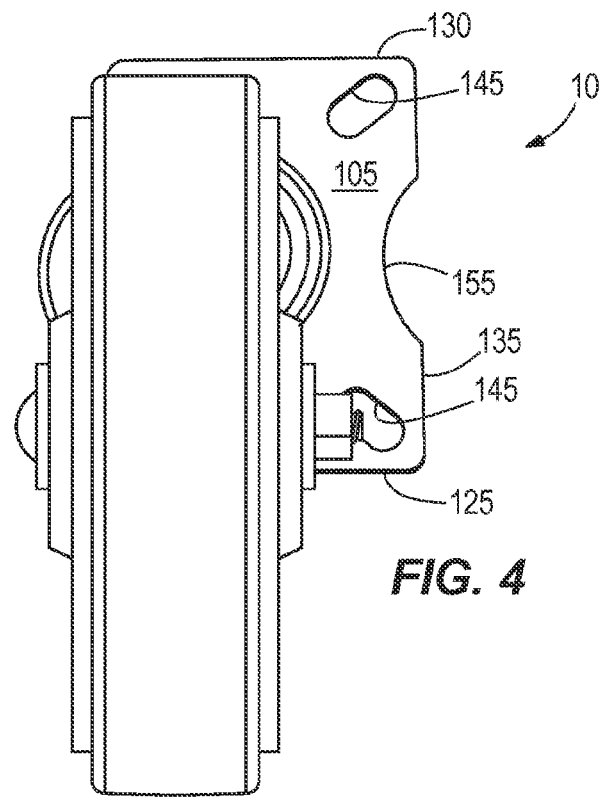
FIG. 4 is a bottom view of the caster of FIG. 2.

The first edge 135, best illustrated in FIG. 4 includes a recess portion 155. The recess portion 155 is defined by a portion of a circular segment but could be defined by any arc or curve desired. The second edge 140, best illustrated in FIGS. 2 and 5 includes a bulge portion 160 that extends outward beyond the remainder of the edge 140. In the illustrated construction, the bulge portion 160 is formed from a portion of a circular segment but could be defined by any arc or curve desired.

Figure 7:
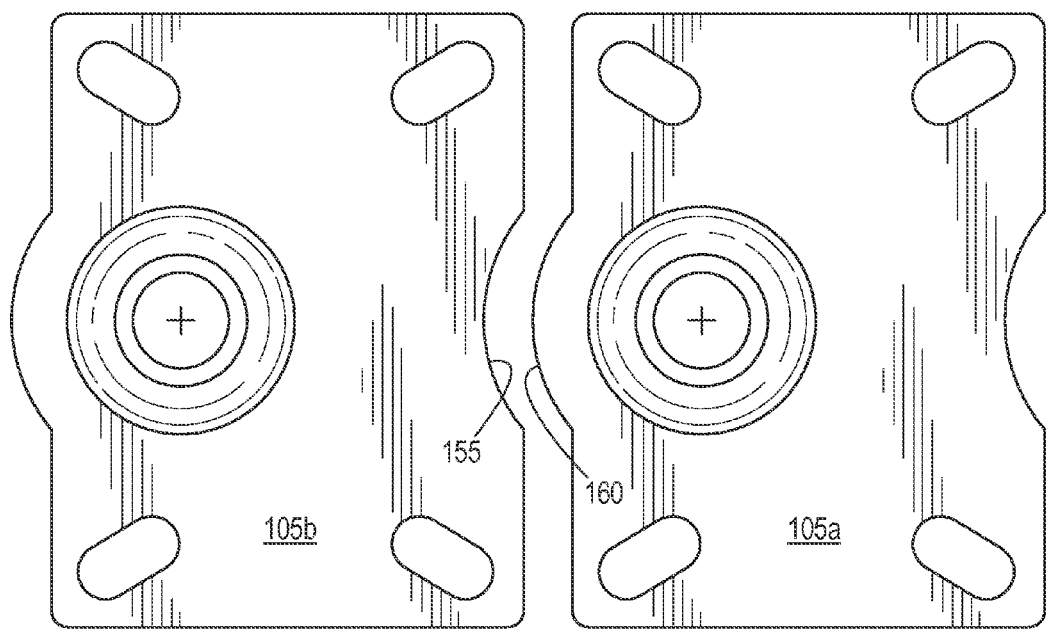
FIG. 7 is a top view of two mounting plates positioned adjacent one another.

In preferred constructions, the bulge portion 160 and the recess portion 155 are formed with similar or identical circular segments, or other curves, to allow the bulge portion 160 of one plate 105a to nest into the recess portion 155 of a second plate 105b as illustrated in FIG. 7. This nesting arrangement allows for the manufacture of multiple plates 105 with a minimum of wasted material. In preferred constructions, the plates 105 are simply stamped or cut from a sheet of material with each cut defining the recess portion 155 of one plate 105b and the bulge portion 160 of another plate 105a.

Figure 5:
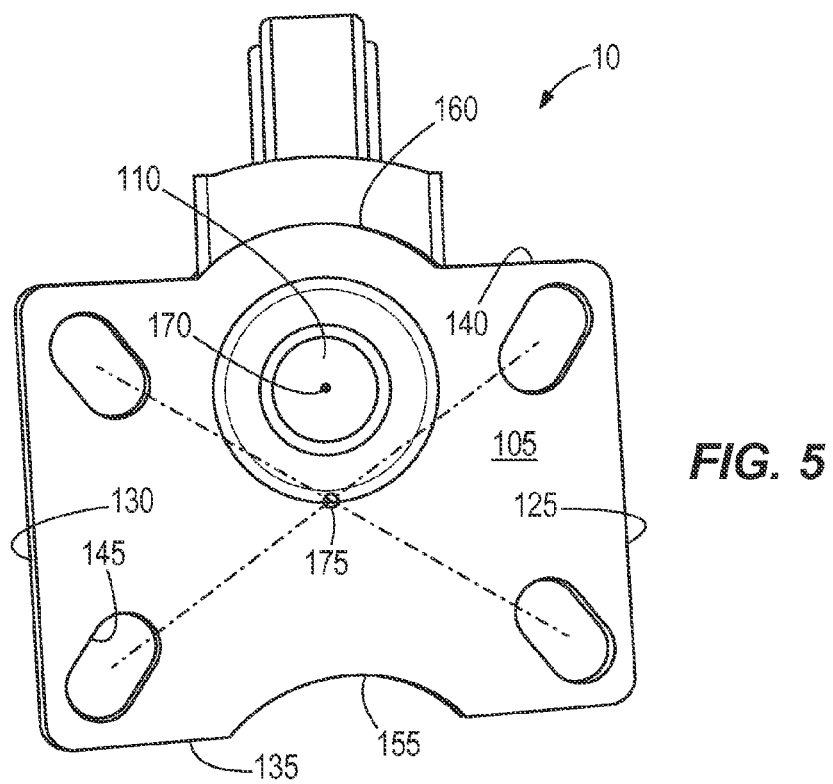
FIG. 5 is a top view of the caster of FIG. 2.

An aperture 165 is formed in the plate 105 to receive the pin 110 and facilitate the attachment of the wheel 115 to the plate 105. The placement of the bulge portion 160 allows the aperture 165 to be positioned off-center in the plate 105. As shown in FIGS. 5 and 7, the aperture 165 is placed much closer to the second edge 140 which includes the bulge 160 than it is to the first edge 135. The bulge portion 160 assures that there is sufficient material between the aperture 165 and any edges to reduce the likelihood or premature failure of the plate 105.

Figure 6:
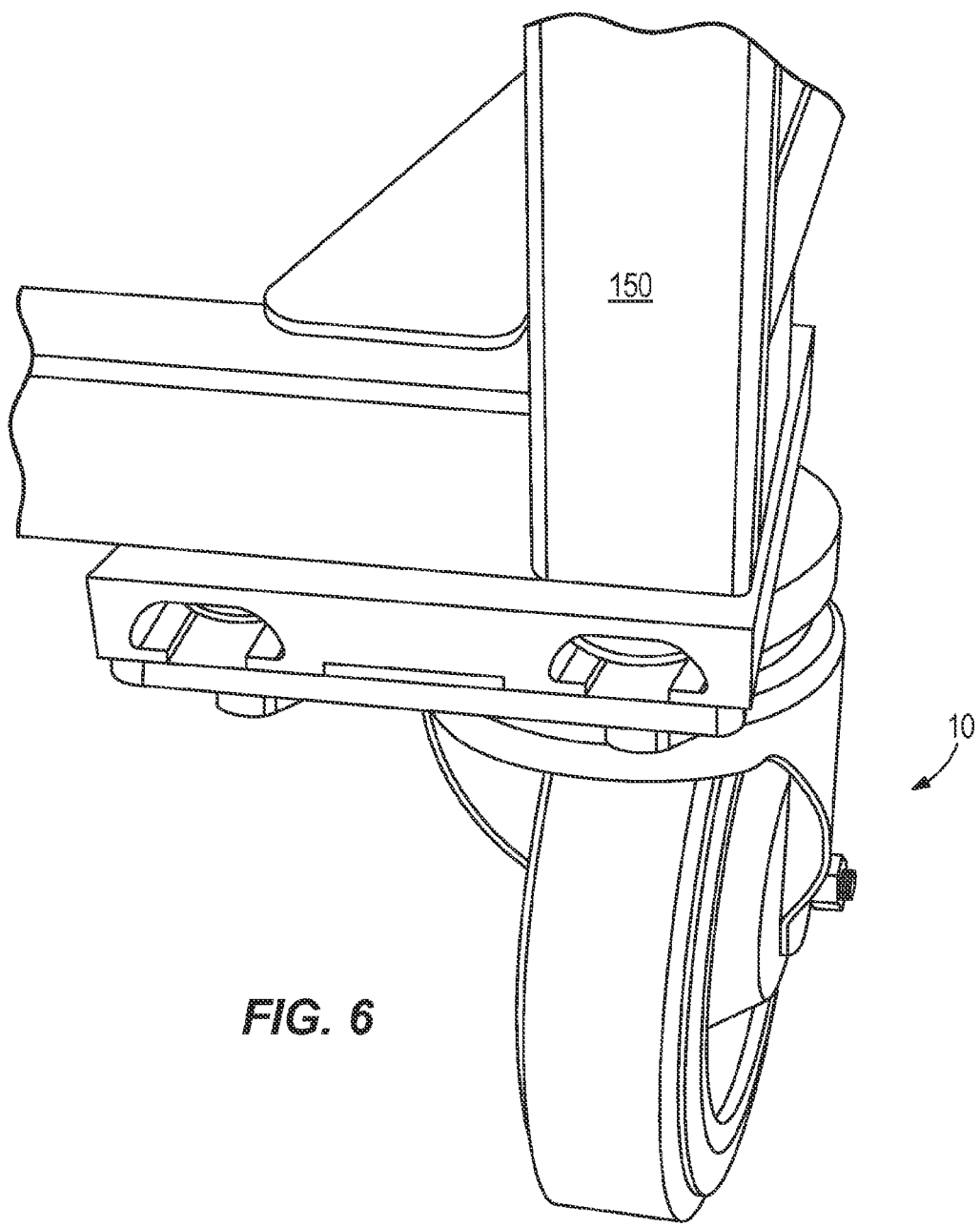
FIG. 6 is a perspective view of the caster of FIG. 2 attached to a device for rolling support.

The off-center position of the aperture 165 allows the wheel 115 to be mounted on an axis 170 that is offset with respect to a center 175 of the plate 105 as defined by the four mounting apertures 145. Thus, as illustrated in FIG. 6, when the castor 100 is attached to the object 150, the wheels 115 can be positioned farther apart than would be possible with prior art castors 10. The wider base allows for more stable movement of the object 150 on the wheels 115.

Various features and advantages of the invention are set forth in the following claims.

We claim:

1. A caster comprising:
a wheel supported for rotation about a rolling axis;
a pin extending from the wheel along a pin axis in a direction normal to the rolling axis;
a mounting plate including a first aperture, the pin is rotatably inserted into the first aperture such that the wheel is rotatable about the pin axis, the mounting plate including a plurality of mounting apertures arranged around the first aperture, wherein a first of the mounting apertures is a first distance from the pin axis and a second of the mounting apertures is a second distance from the pin axis, the second distance being greater than the first distance; and
a bearing positioned between the mounting plate and the wheel and arranged to support rotation about the pin axis, wherein the mounting plate includes a first edge, a second edge, and a third edge perpendicular to the first edge and the second edge, and wherein a fourth edge opposite the third edge includes a bulge portion, the first aperture being positioned adjacent the fourth edge, and wherein the third edge includes a recess portion having the same shape as the bulge portion such that the third edge is sized and shaped to match the fourth edge of a separate mounting plate in a nested arrangement.

2. The caster of claim 1, wherein the first edge and the second edge are substantially linear.

3. The caster of claim 1, wherein the plurality of mounting apertures includes exactly four apertures.

4. The caster of claim 3, wherein the four mounting apertures are arranged in a rectangular pattern, wherein the mounting plate includes four corners, and wherein diagonal lines drawn between those corners intersect at a plate mounting center, and wherein the pin axis is offset a non-zero distance from the plate mounting center.

5. A caster comprising:
a mounting plate including a first mounting aperture, a second mounting aperture, a third mounting aperture, and a fourth mounting aperture each arranged to define a rectangular pattern, and a wheel aperture having a center in the space defined by the rectangle and positioned nearer to a line extending between the first aperture and the second aperture than to a line extending between the third aperture and the fourth aperture, the first mounting aperture, the second mounting aperture, the third mounting aperture, and the fourth mounting aperture being the only mounting apertures in the plate;
a wheel supported for rotation about a rolling axis;
a pin coupled to the wheel and extending along a pin axis that is substantially normal to the rolling axis and that extends through the center of the wheel aperture; and
a bearing interconnecting the wheel and the mounting plate such that the pin is received in the wheel aperture and the wheel is rotatable about the pin axis, wherein the mounting plate includes a first edge, a second edge, and a third edge perpendicular to the first edge and the second edge, and wherein a fourth edge opposite the third edge includes a bulge portion, the first mounting aperture and the second mounting aperture being positioned adjacent the fourth edge, wherein the third edge includes a recess portion having the same shape as the bulge portion such that the third edge is sized and shaped to match the fourth edge of a separate mounting plate in a nested arrangement.

6. The caster of claim 5, wherein the first edge and the second edge are substantially linear.

7. The caster of claim 5, wherein diagonal lines drawn between the corners of the rectangle intersect at a plate mounting center, and wherein the pin axis is offset a non-zero distance from the plate mounting center.

* * * * *